R. R. McGREGOR.
Axle Box.
No. 102,025.
Patented April 19, 1870.
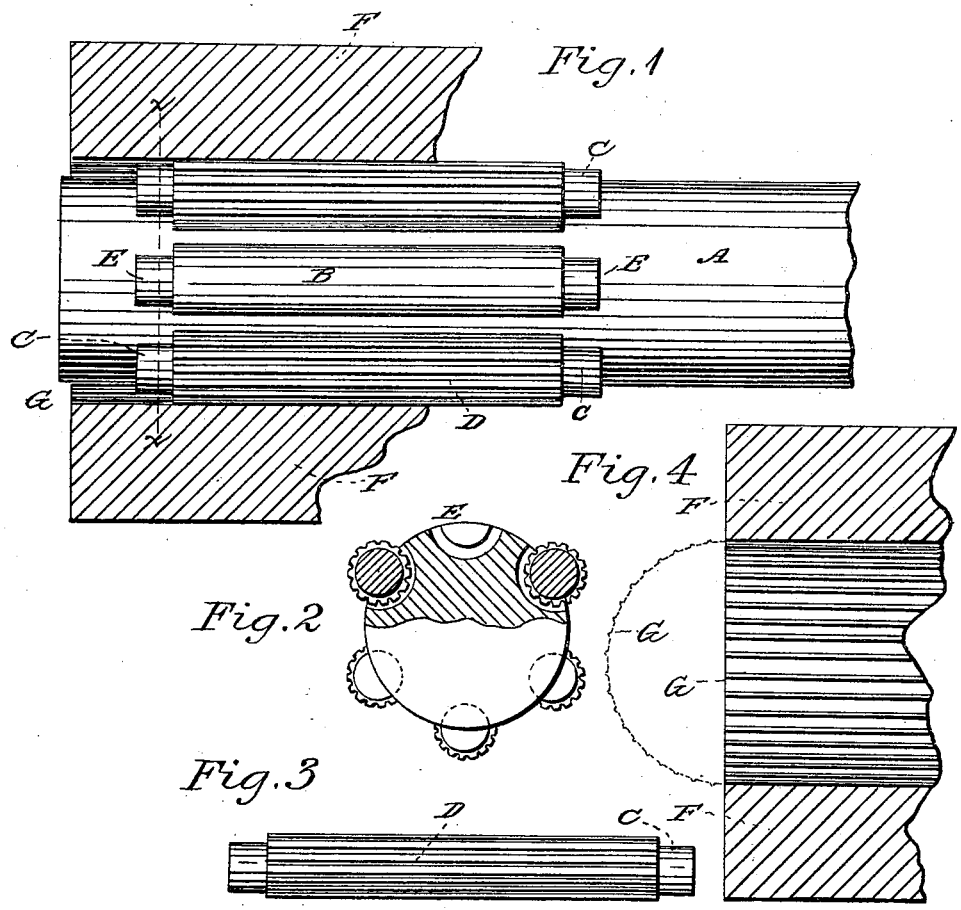
Witnesses:
Fred. Artos
William Kaiser
Inventor:
Rob. Roy McGregor
per Kadsan Brothers
his Attys

United States Patent Office.

ROB ROY McGREGOR, OF COVINGTON, TENNESSEE.

Letters Patent No. 102,025, dated April 19, 1870.

IMPROVEMENT IN AXLES AND THEIR BOXING.

The Schedule referred to in these Letters Patent and making part of the same

*To all whom it may concern:*

Be it known that I, ROB ROY MCGREGOR, of Covington, in the county of Tipton and State of Tennessee, have invented new and Improved Axles and their Boxing; and I do hereby declare that the following is a full, clear, and exact description thereof, reference being had to the accompanying drawings and to the letters of reference marked thereon.

Drawings.

Figure 1 is a perspective view, partly in section, of an axle and its boxing, constructed upon the plan of my invention, one of the rollers having been removed.

Figure 2 is a transverse vertical section of the axle and its rollers, on the line $x\ x$ of fig. 1.

Figure 3 is a view of one of the rollers when removed from the axle.

Figure 4 is an elevation through the center of the boxing, showing its corrugations.

Similar letters of reference denote like parts in each of the figures.

This invention relates to that class of inventions the object of which is to reduce friction on the bearings of axles, and it consists, first, in the combination of rollers, constructed as herein shown and described, with an axle; and, second, in the combination with said rollers and axle, of a boxing having a corrugated surface, all of which will be more fully herein set forth.

In the drawings—

A is an axle having slots, B, semicircular in form, cut in its surface, as clearly shown in the drawings. Its size is diminished at each end sufficient to form a shoulder upon which to rest the journals C of the rollers.

D are rollers fluted or corrugated, as shown, the object in having such corrugations being to increase the amount of friction as between the rollers and the hub or boxing of the wheel, thereby increasing the chances several fold of causing the rollers to revolve upon their smooth journals.

C are the journals that rest upon the shoulders, being formed as before described.

The rollers have been constructed heretofore with a smooth surface, and combined with the axle upon pivots.

F is the boxing, having a corrugated surface, G, to act upon, and in combination with the rollers D.

Among others, I may mention the following objections as existing against rollers constructed and combined with an axle as just described, viz: they cannot be made durable enough to prevent them from breaking in; they cannot be removed without breaking them loose from the axle, and, further, the friction is not great enough to cause the rollers to revolve freely. Especially is this the case with vehicles carrying heavy loads, where the advantage of this invention becomes most beneficial.

The object being to diminish the actual amount of friction, I construct my rollers the full width of the hub or boxing of the wheel, or thereabout, so as to distribute the weight of the load over as large a surface as possible, thus rendering the friction less on each particular point.

While I increase the amount of friction between the rollers and the hub or boxing, yet the amount of force required to make the wheel revolve is far less than it would be if the rollers had a smooth surface. The rollers resting upon their smooth journals are sure to revolve, which is the object to be attained.

I do not claim broadly the application of friction rollers to axles; neither do I claim slots or recesses cut in the surface of such axles, for such I am aware is not new, but What I do claim, and desire to secure by Letters Patent of the United States, is—

1. The rollers D, having corrugated surfaces, in combination with the axle A, said axle having semicircular slots B and shoulders E, as shown and described, and for the purpose set forth.

2. The corrugated boxing F, having the surface G, to act upon and in combination with the rollers D.

Signed at Covington, Tennessee, this 1st day of February, 1870, in the presence of two subscribing witnesses R. R. McGREGOR.

Witnesses:
PEYT COLLIER,
J. B. CALHOUN.